C. BOWEN.
BUMPER FOR AUTOMOBILES.
APPLICATION FILED MAY 3, 1920.

1,363,202.

Patented Dec. 21, 1920.

Charles Bowen, Inventor

By A. G. Burns
Attorney

UNITED STATES PATENT OFFICE.

CHARLES BOWEN, OF FORT WAYNE, INDIANA, ASSIGNOR OF ONE-FIFTH TO FRED GASKINS, ONE-FIFTH TO ARTHUR G. NIEBERGALL, ONE-FIFTH TO JOHN E. O'CONNOR, AND ONE-FIFTH TO CHARLES A. SPANLEY, ALL OF FORT WAYNE, INDIANA.

BUMPER FOR AUTOMOBILES.

1,363,202.      Specification of Letters Patent.      Patented Dec. 21, 1920.

Application filed May 3, 1920. Serial No. 378,361.

*To all whom it may concern:*

Be it known that I, CHARLES BOWEN, a citizen of the United States of America, and resident of Fort Wayne, in the county of Allen and State of Indiana, have invented certain new and useful Improvements in Bumpers for Automobiles, of which the following is a specification.

This invention relates to improvements in bumpers for automobiles which have frames that protrude at each end, and the object thereof is to provide a bumper having yielding tendencies and rigid supporting means in connection with the frame of an automobile and to so construct the supporting means that the bumper attached thereto will be held from vertical and lateral vibrations.

Figure 1:
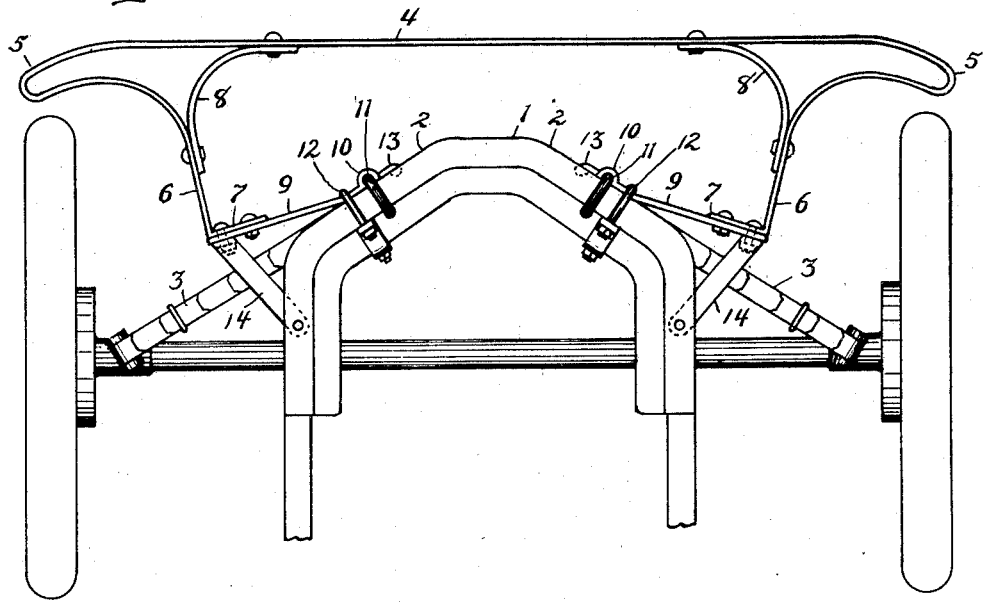
Figure 2:
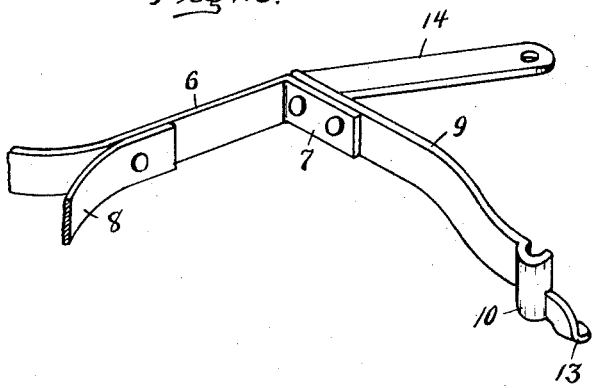

The object of the improvement is accomplished by the construction illustrated in the accompanying drawings in which:

Figure 1 is a plan view of the bumper and its supporting means in connection with the frame of an automobile; and Fig. 2 is a detail view in perspective showing one of the supporting brackets, the corresponding end of the bumper attached thereto and its brace.

Similar characters of reference indicate corresponding parts in both views and having reference now to the same:

1 is a protruding end of an automobile frame of well known construction having convergent portions 2 to which are secured the supporting springs 3. The bumper is comprised of a metallic bar 4, each end of which is formed with a curved hook 5 and corresponding arm 6 with a bent extremity 7. Each arm has riveted thereto a curved brace 8 that has also riveted connection with the outer portion of the bumper that extends between its hooked ends.

A supporting bracket 9 is provided for each of the ends of the bumper, the bent extremity at each end of the bar being secured to the outer end of the corresponding bracket. The inner end of each bracket has formed therein a hook 10 adapted to fit over the corresponding clip 11 that secures the spring 3 to the side 2 of the frame 1, and is rigidly secured to the adjacent face of the spring and to the frame by means of a clip 12. Each bracket has also an integral bent finger 13 that projects from its hooked end and which is adapted to project inwardly beneath the corresponding edge of the frame.

The outer end of each bracket has connection also with a brace 14 which is connected rigidly at its opposite end with the corresponding side of the frame of the automobile.

The bumper thus constructed and supported by the brackets is held from lateral and vertical oscillating movements relative to the frame, the braces 14 being so positioned as to prevent swinging of the bracket and endwise movement of the arm 6.

The extending hooks 5 have a yielding tendency as has also that portion of the bar 4 between the curved braces 8, and thus the bumper, while rigidly supported and braced, is held in its proper relation to the frame of the automobile and yieldingly resists impacts that may be imposed upon it.

What I claim is:

1. In a bumper for automobiles, a bar, each end of which is formed with a curved hook and corresponding arm with a bent extremity; a curved brace fixed to each arm and connected also to that portion of the bar between the hooks; a supporting bracket for each arm of the bumper, the inner end of which is rigidly connected to the automobile frame and with its outer end secured to the bent extremity of the corresponding arm; and a brace for each bracket having connection at one end with the outer end of the bracket and at its opposite end with the side of the frame.

2. In a bumper for automobiles, a bar, each end of which is formed with a hook and corresponding arm; an inwardly extending supporting bracket for each arm, the inner end of which is adapted to be attached to the automobile frame and with its outer end having rigid connection with the arm; and a brace for each bracket having connection at one end with the outer end of the bracket and at its opposite end with the side of the frame.

3. In a bumper for automobiles, a bar formed with oppositely extending hooks and corresponding arms; an inwardly extending supporting bracket for each arm, each bracket having formed in its inner portion a hook and extending bent finger; means for securing the inner portion of each bracket to the frame of the automobile; and a brace in connection with the outer end of each bracket and with the corresponding side of the frame adapted to prevent swinging of the bracket and endwise movement of the arm relative to the frame.

In testimony whereof I affix my signature, in presence of two witnesses.

CHARLES BOWEN.

Witnesses:
J. W. DICKENS,
MATILDA METTLER.